United States Patent

Cole et al.

Patent Number: 5,854,901
Date of Patent: Dec. 29, 1998

[54] METHOD AND APPARATUS FOR SERVERLESS INTERNET PROTOCOL ADDRESS DISCOVERY USING SOURCE ADDRESS OF BROADCAST OR UNICAST PACKET

[75] Inventors: Bruce A. Cole, Mountain View; James Ronald Forster, Los Altos, both of Calif.

[73] Assignee: Cisco Systems, Inc., San Jose, Calif.

[21] Appl. No.: 685,043

[22] Filed: Jul. 23, 1996

[51] Int. Cl.$^6$ .................................................. H04L 12/00
[52] U.S. Cl. ............................. 395/200.75; 395/200.52; 395/200.55; 395/200.58; 395/200.61
[58] Field of Search ........................ 395/200.52, 200.58, 395/200.75, 200.55, 200.61

[56] References Cited

U.S. PATENT DOCUMENTS

| | | | |
|---|---|---|---|
| 5,150,464 | 9/1992 | Sidhu et al. ........................ | 395/200.52 |
| 5,282,270 | 1/1994 | Oppenheimer et al. ........... | 395/200.53 |
| 5,526,489 | 6/1996 | Nilakantan et al. ............... | 395/200.58 |
| 5,598,536 | 1/1997 | Slaughter, III et al. ........... | 395/200.49 |

*Primary Examiner*—Kenneth S. Kim
*Attorney, Agent, or Firm*—Marger, Johnson, et al.

[57] ABSTRACT

An IP address is automatically discovered by a network endpoint, such as a PC or router. The endpoint listens for a broadcast network packet or promiscuously listens for a unicast network packet sent from a web browser from a host system. The network packet includes the IP address for the host system and a preselected IP domain name. The IP domain name is used to initiate the address discovery in the endpoint. The IP address from the host system is used by the endpoint as a seed for generating a proposed IP network address. The endpoint then uses an address resolution protocol (ARP) to determine whether the proposed IP address is currently assigned to any other device in the network. If no device in the network responds to the ARP request, the proposed IP address constitutes a unique address on a network segment. Because the proposed address is not used by any other device in the subnetwork, it is self-assigned to the endpoint.

22 Claims, 5 Drawing Sheets

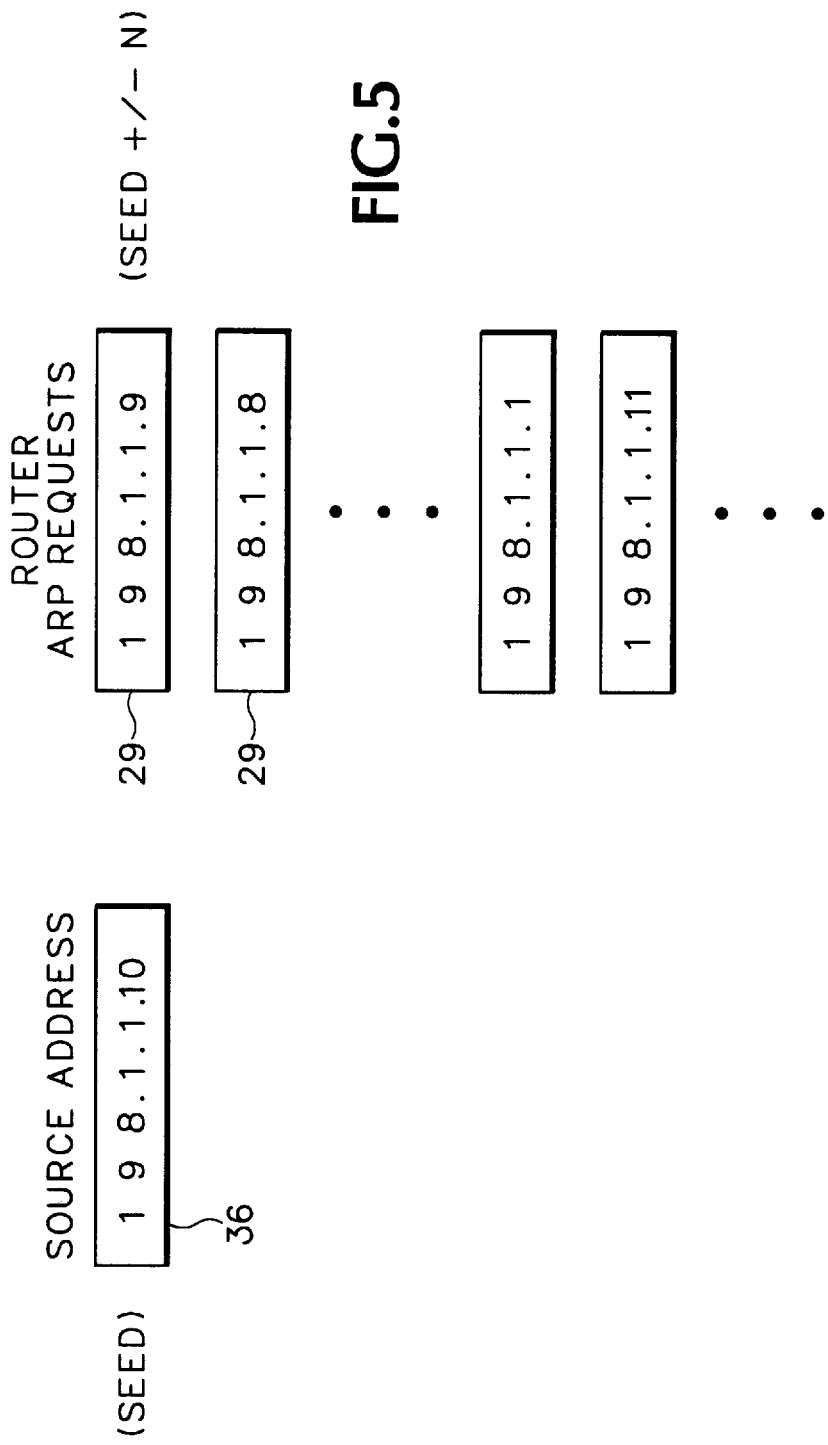

METHOD AND APPARATUS FOR SERVERLESS INTERNET PROTOCOL ADDRESS DISCOVERY USING SOURCE ADDRESS OF BROADCAST OR UNICAST PACKET

BACKGROUND OF THE INVENTION

This invention relates generally to internet protocol (IP) addressing and more particularly to a serverless network protocol that heuristically discovers IP addresses for network endpoints.

Devices connected on a network, such as routers and personal computers (PCs), must be assigned unique internet addresses in order to communicate with other systems over the internet. In order to assign and configure an IP address on a router, a system administrator typically connects a personal computer (PC) into a special serial port on the router. The system administrator manually identifies a unique IP address and then downloads the IP address through the PC to the router.

Manually assigning IP addresses and then manually downloading the assigned address into the router requires a significant amount of time and a significant amount of system administration knowledge. For example, the system administrator must understand special hardware and software command procedures used for downloading the IP address into the router. The system administrator must also know which IP addresses are available for assigning to new devices connected to the network.

Some protocols such as Reverse Address Resolution Protocol (RARP), Bootstrap Protocol (BOOTP) and Dynamic Host Configuration Protocol (DHCP) attempt to resolve the complexity of assigning addresses to network devices. However, each of these protocols use a network server that is already installed and configured on the network. A SLARP protocol comprises a SLARP packet encapsulated in a High Level Data Link Control (HDLC) protocol. SLARP does not require network servers to assign network addresses. However, SLARP can only be used for point-to-point HDLC encapsulated media. Thus, SLARP is not effective in many local area network (LAN) using broadcast protocols.

Accordingly, a need remains for simplifying the task of assigning IP addresses to devices in serverless local area networks.

SUMMARY OF THE INVENTION

An IP address is heuristically discovered by a network endpoint. The endpoint, such as a PC, router or communication server receives a network packet from a host system. The network packet includes the IP address for the host system and a preselected IP domain name. The endpoint uses the IP address from the host system as a seed for generating proposed IP network addresses. The endpoint uses an Address Resolution Protocol (ARP) request to determine whether the proposed IP address is assigned to any other device on the network. If no device in the network responds to the ARP request, the proposed IP address is available and, in turn, self-assigned to the endpoint. Because the endpoint derives the proposed address from another device on the network segment, namely the host system, the derived address will necessarily contain the proper addressing for the local network where the endpoint is connected.

In one embodiment, the network packet is generated from a web browser on the host system. A user enters a Universal Resource Locator (URL) request for the preselected domain name. The URL request generates a Domain Name System (DNS) request packet that is broadcast over the network. The host system is configured with a broadcast address for transmitting DNS requests. Thus, any DNS requests are broadcast to all clients on the network segment. Alternatively, the endpoint operates in a promiscuous mode when a DNS request is unicast to a specific DNS server. The endpoint promiscuously reads the DNS request to determine the network address.

The endpoint parses DNS packets for the DNS request containing the preselected domain name. The endpoint initiates the ARP request after identifying the DNS request packet having the preselected domain name. The endpoint then generates proposed IP addresses by incrementing or decrementing the network address associated with the IP source address in the identified DNS packet. The endpoint generates an ARP request for each proposed IP address. If an ARP request is answered, the proposed IP address is currently assigned to another device in the network. The endpoint then generates another proposed address and sends another ARP request. If the ARP request returns unanswered after several ARP requests, the proposed IP address is available for use by the endpoint without conflicting with the IP address assigned to another device on the network. The proposed address is then used as the IP address for the endpoint.

After discovering its own IP address, the endpoint responds to the next DNS request from the host system. The endpoint response triggers subsequent establishment of a HyperText Transfer Protocol (HTTP) connection between the host system and a web server running on the endpoint. The host system then configures the endpoint through the HTTP connection.

In another embodiment of the invention, endpoint address discovery is initiated without using a DNS request packet. The user enters an HTTP request directly into the web browser containing a broadcast address. The HTTP broadcast initiates the endpoint address discovery process.

The foregoing and other objects, features and advantages of the invention will become more readily apparent from the following detailed description of a preferred embodiment of the invention which proceeds with reference to the accompanying drawings.

BRIEF DESCRIPTION OF DRAWINGS

FIG. 5 is a schematic diagram showing proposed IP addresses generated by the router in FIG. 1.

DETAILED DESCRIPTION OF THE INVENTION

Figure 1:
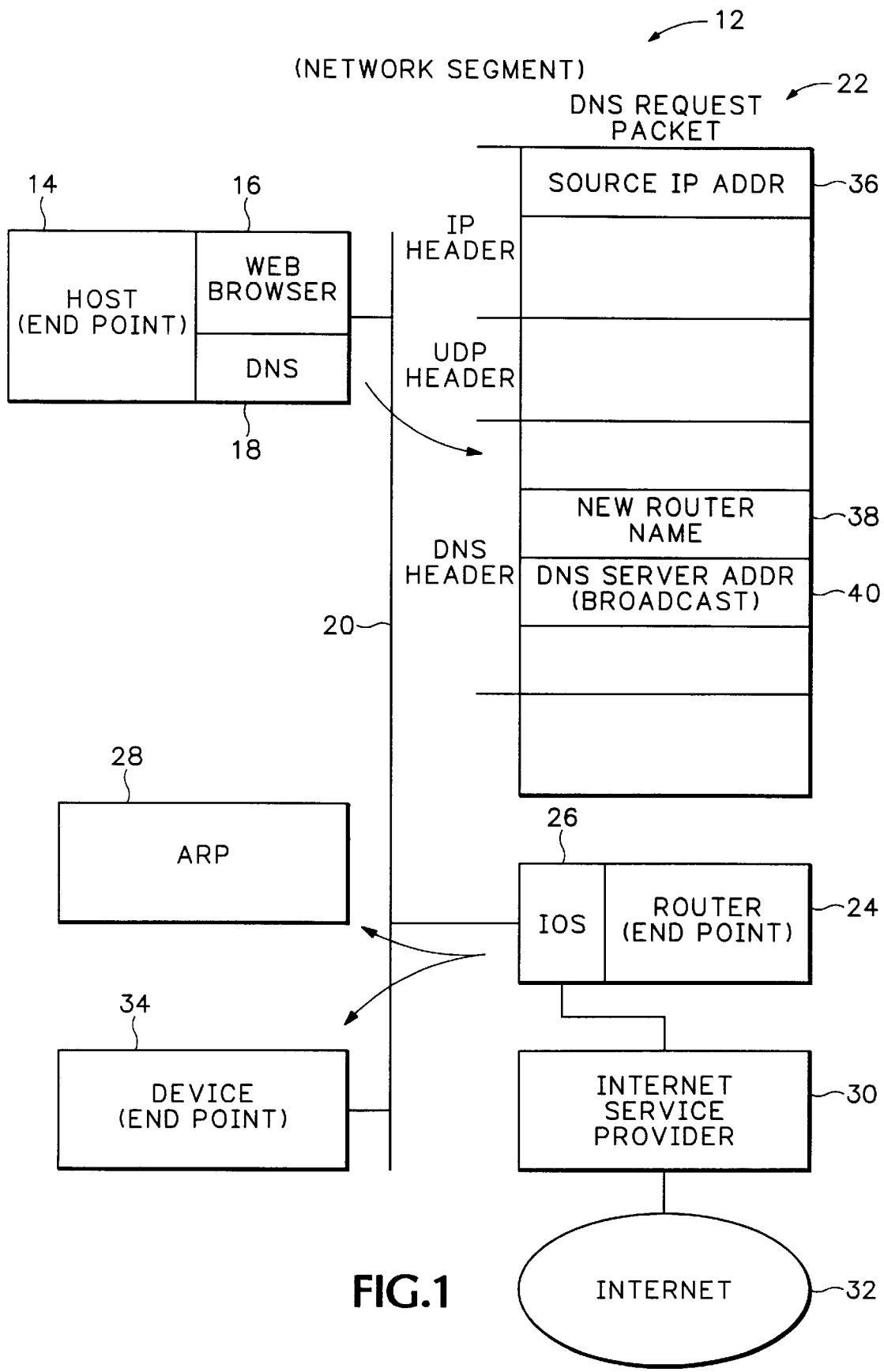
FIG. 1 is a schematic diagram of a serverless IP address discovery system according to the invention.

Referring to FIG. 1, an address discovery system 12 includes a network segment 20 coupled to a host system 14 and an endpoint 24. According to one embodiment of the invention, the endpoint 24 is coupled through an internet service provider 30 to an internet infrastructure 32. Other devices with assigned internet addresses, such as device 34 are also connected to network segment 20.

The network segment 20 typically utilizes any one of an Ethernet, Fiber Distributed Data Interface (FDDI) or Token Ring protocol. In one embodiment, the host system 14 is a personal computer (PC) running either a Microsoft® or Apple® operating system. The host system 14 contains a web browser 16, such as the Netscape Navigator manufactured by Netscape Communications Corporation. The web browser 16 includes an interface to Domain Name System (DNS) software 18 which comes with the operating system on the host system 14. DNS software is well known to those skilled in the art.

In one embodiment, the endpoint 24 comprises a network router such as the Cisco model number 1003 or 1004 manufactured by Cisco Systems, Inc., San Jose, Calif. For clarity, the endpoint 24 is referred to as a router. However, the router represents any device that uses an IP address. For example, router 24 can comprise a PC or file server. The router 24 utilizes an existing Internet Operating System (IOS) 24 for conducting transactions on network segment 20.

The user enters a preselected URL "http://new-router.cisco.com/" into the web browser 16. The URL initiates transmission of a DNS request packet 22 on network segment 20. The host system 14 is configured to use a broadcast address for the DNS server. Thus, the DNS request packet 22 is transmitted in an IP format and broadcast to all devices on network 20. The IP packet header includes an IP source address 36 and a DNS header including a broadcast DNS server address 40 and the preselected IP domain name 38 (new-router.cisco.com).

Alternatively, the router 24 is operated in a promiscuous mode and listens for all DNS requests. A DNS request unicast by the host 14 to a DNS server is identified by the router 24 as containing the predetermined domain name "new-router.cisco.com". The router 24 then initiates the address discovery protocol as described below. In yet another embodiment of the invention, router address discovery can be initiated without using DNS request packets. A user enters an HTTP broadcast address such as "HTTP://255.255.255.255/" into the web browser. The router 24 is programmed to initiate the address discovery protocol after receiving the IP broadcast address.

The IOS 26 in router 24 is hard coded with the domain name "new-router.cisco.com". The router 24 parses DNS packets for requests containing the prestored domain name 38. After identifying the DNS request packet 22, the router begins an address discovery protocol to identify an available IP address on the network segment 20. The router 24 uses the source address 36 as a seed for discovering an available IP address. The router first generates a proposed IP address. The router 24 then sends ARP request 28 out on the network to determine whether the proposed IP address is assigned to another device.

If an ARP request is answered, the proposed IP address is already assigned to another device on the network segment 20. The router 24 then generates a new proposed IP address, still using the host system address as a seed. If the next ARP request 28 comes back unanswered after several ARP attempts, router 24 concludes that the proposed IP address is available. The router 24 then assigns itself the IP address. Thus, the router 24 automatically discovers its own IP address without manual assignment or downloading from a system administrator.

Figure 2:
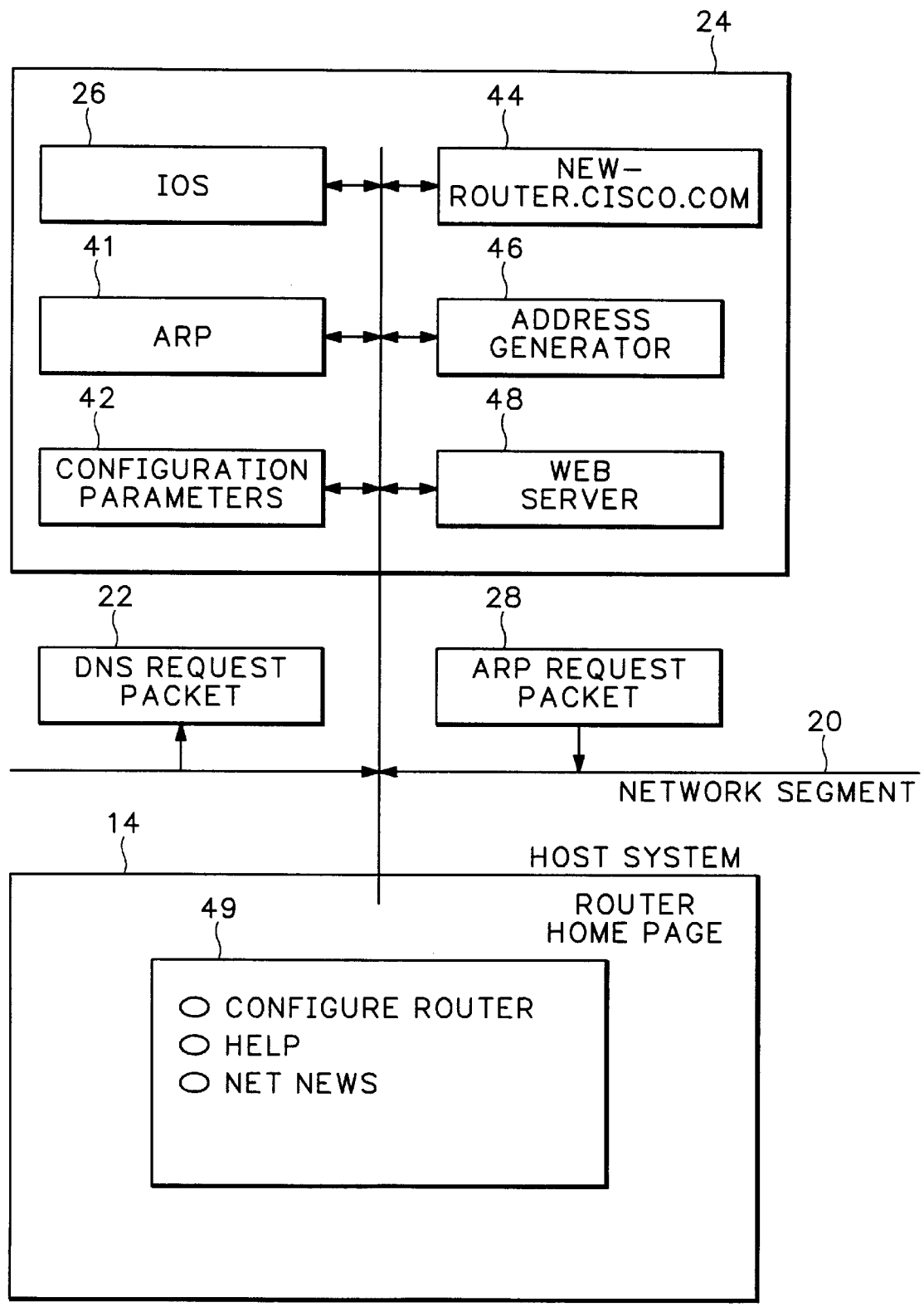
FIG. 2 is a detailed block diagram for a router shown in FIG. 1.

Referring to FIG. 2, the router 24 contains the IOS module 26 for controlling internet transactions. ARP module 41 controls ARP requests 28 and a module 42 stores router configuration parameters. A register 44 stores the preselected domain name "new-router.cisco.com" matching the domain name in DNS request packet 22. An address generator 46 generates proposed IP addresses used in the ARP requests 28 generated by module 41. A web server module 48 accepts an HTTP connection from the host system 14 after the router has discovered its own IP address. The web server module 48 contains a HyperText Markup Language (HTML) home page 49 displayed on host system 14. The web server module 48 is used by the host system 14 to configure router 24.

Figure 3:
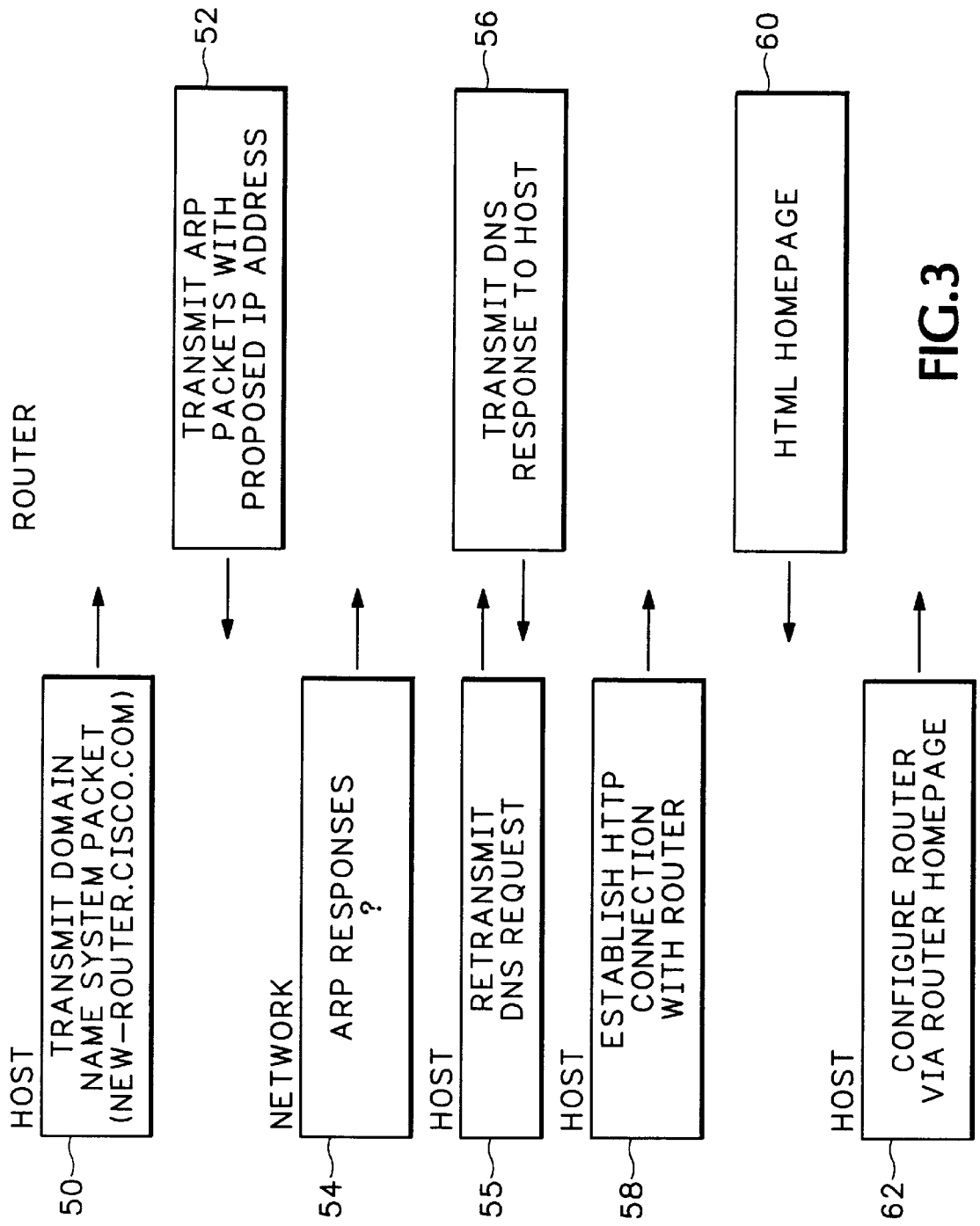
FIG. 3 is a transaction diagram for the system shown in FIG. 1.

Referring to FIG. 3, the router 24 conducts the following transactions with the host system 14 and other devices coupled to the network segment 20. Transaction 50 broadcasts the DNS request packet 22 over the network segment 20. The DNS packet 22 includes the preselected domain name (e.g., "new-router.cisco.com") that is also prestored in router 24. The router 24 parses DNS request packets for ones containing the domain name "new-router.cisco.com". If an IP broadcast address is input directly into the web browser, the router is preprogrammed to initiate the address discovery protocol after receiving the IP broadcast packet.

After identifying the "new-router.cisco.com" DNS packet, the router initiates an IP address discovery process. The discovery process determines whether proposed IP addresses are available for use by the router. The router 24 uses ARP requests to determine the availability of a proposed IP address. Accordingly, transaction 52 transmits ARP request packets 28 over the network segment 20. Each ARP request packet 28 includes a proposed IP address derived from the source address 36 as described in detail below.

Any device on network segment 20 (FIG. 1) that has an IP address matching the proposed IP address, responds to the ARP request in transaction 54. If there is no reply to the ARP request after being transmitted several times, the proposed IP address associated with the ARP request is assigned to the router. The host system retransmits the DNS request 55. After identifying an available IP address, the router responds to the next DNS request packet 55 sent by the host system 16 in transaction 56. The host system 14 then establishes an HTTP connection with the router 24 in transaction 58. The router 24 supplies a web home page to the host system 14 in transaction 60. The web home page is used by the host system 14 as a platform to send configuration parameters to the router 24 in transaction 62.

The router 24 can operate in a promiscuous or non-promiscuous mode when receiving responses to ARP requests. The router can send an ARP request that includes a MAC source address and an IP source address of the host system 14. The ARP response is unicast to the MAC address specified in the source MAC field of the ARP request. The router 24 must then operate in a promiscuous mode to identify any response to the ARP request. If the router 24 sends an ARP request that includes a source MAC address which is the proposed address of the router, any ARP response is unicast directly to the router 24. Thus, it would not be necessary for the router to operate in a promiscuous mode. The address fields used in the ARP request can change as stated above according to network constraints.

Figure 4:
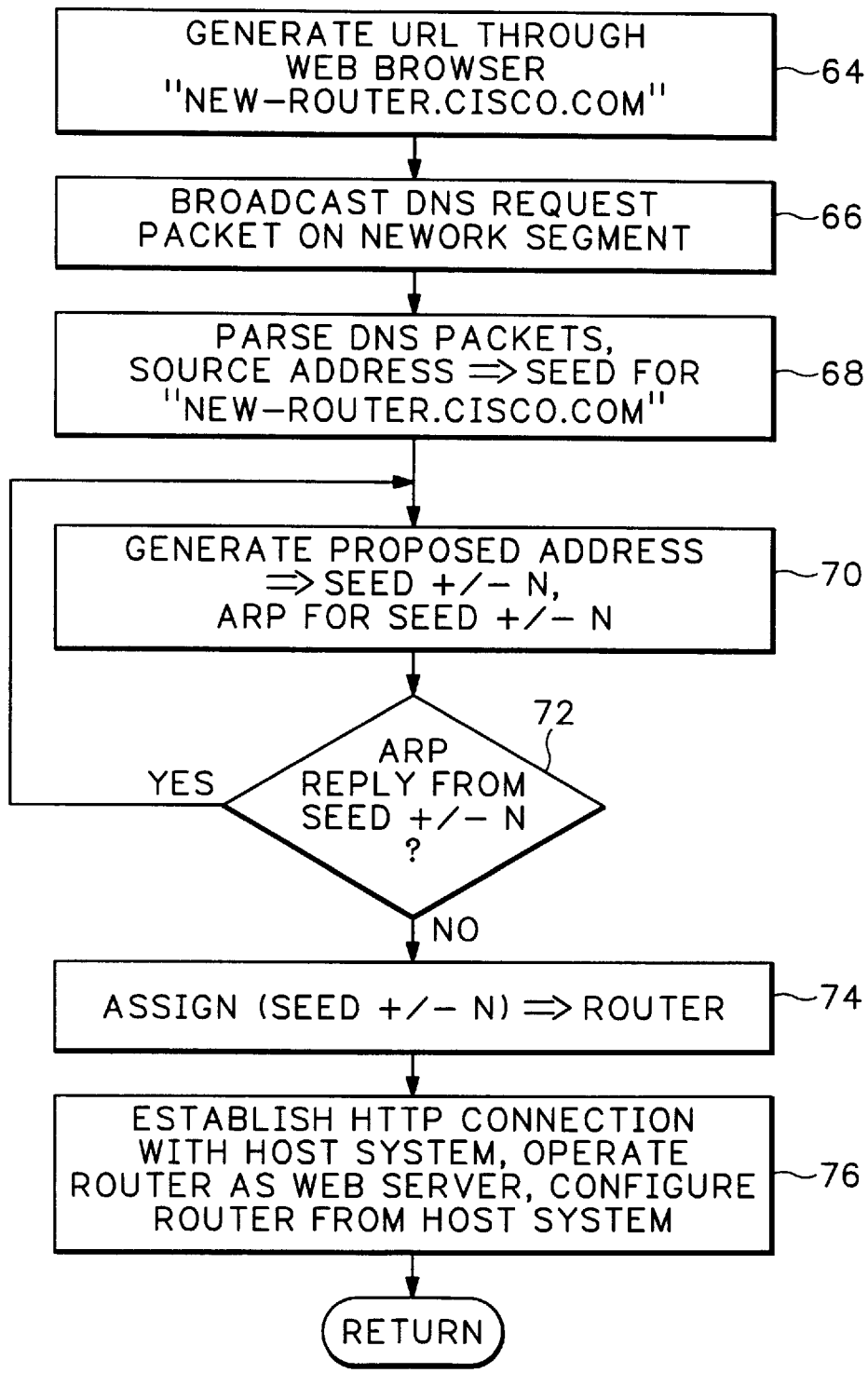
FIG. 4 is a step diagram showing the address discovery scheme conducted by the system in FIG. 1.

Referring to FIG. 4, the address discovery system 12 shown in FIG. 1 conducts the following steps. The URL "http://new-router.cisco.com/" is entered by a user through the web browser 16 in step 64. The URL initiates a DNS request packet 22 in step 66. The host system 14 is configured with a broadcast address that broadcasts the DNS request packet to each device on the network segment 20.

Alternatively, the host system 14 is not configured with a DNS server broadcast address, but is configured with the address of a DNS server. The router 24 promiscuously listens for all DNS requests on network segment 20. When the router 24 identifies the domain name "new-router.cisco.com" in the unicast DNS request from host system 14 to the DNS server, the address discovery process is initiated. In another embodiment of the invention, the user directly enters a special IP broadcast address into the web browser 16. For example, a URL "http://255.255.255.255/" is entered into the web browser and transmitted over the network segment 20. The router 24 identifies the IP packet as a broadcast address and accordingly initiates the address discovery protocol discussed below. Thus, the address discovery process can be initiated without generating a DNS request packet.

The router parses DNS packets in step 68. The DNS packet containing the domain name "new-router.cisco.com" initiates the router 24 to begin the address discovery process. The router 24 uses the source address from the DNS packet 22 as a seed for generating proposed IP addresses. In step 70, the router 24 generates the proposed IP addresses by incrementing or decrementing the seed address "SEED +/−N", where N is an integer. Each proposed IP address is broadcast as an ARP request 28 on network segment 20.

Decision step 72 waits for a reply to the ARP request from any device on the network 20. If a reply is received by the router 24, the proposed IP address is already assigned to another device. The router, therefore, generates a new proposed IP address "SEED +/−N" and another ARP request in step 70. If no device responds to an ARP request, the proposed IP address is assigned to the router in step 74.

In step 76, the router 24 waits for the next DNS request packet from the host system 14. The router sends its newly-assigned IP address to the host system 14. An HTTP connection is then established between host system 14 and router 24. The router 24 operates as a web server prompting the host system 14 for configuration parameters, help information, etc. For example, the user enters the correct network mask for network 20 to the router 24 through the HTTP session.

Referring to FIG. 5, the router 24 receives the source address 36 from the DNS request packet 22. The address generator module 46 in router 24 uses the source address 36 as a seed for generating proposed IP addresses used in the ARP requests 28. The seed address is either incremented or decremented (+/−N) for each ARP request. For example, a source address may contain the value "198.1.1.10". The address generator 46 generates a first proposed IP address "SEED −1=>198.1.1.9". The proposed IP address is sent with a first ARP request from router 24. If a device on the network segment 20 has already assigned the IP address "198.1.1.9", the router 24 generates another proposed address by decrementing the seed again "SEED −2=>198.1.1.8". The second proposed address is then sent with another ARP request.

The address generator module 46 decrements the seed address 36 until the host part of the IP address reaches one "198.1.1.1". The address generator module 46 (FIG. 2) then begins to increment the source address 36 (i.e., 198.1.1.11, 198.1.1.12, 198.1.1.13, etc.). The address generator module 46 decrements and/or increments the source address until one of the ARP requests receives no reply. No-reply indicates that the proposed IP addresses is not currently assigned to another device on the network segment 20.

In current IP protocols, IP addresses are 32 bits long. Thus, in one embodiment of the invention the network mask is assumed to be 24 bits long and host addresses are assumed to be 8 bits long. If the network mask is greater than 24 bits, devices coupling the network segment 20 to the rest of the network infrastructure respond to ARP requests for addresses outside the range of the network segment. Thus, the ARP response causes the router 24 to discard any IP address that is not within the assigned address range of the local network segment.

Thus, the invention heuristically discovers available IP addresses on the local network without using a network server. Further, the automatic IP address discovery and protocol conducted by the router relieves the system administrator from having to manually identify an available IP address and then manually assign and download the IP address to the router. The invention is particularly adaptable to local area networks that utilize broadcast addressing.

Having described and illustrated the principles of the invention in a preferred embodiment thereof, it should be apparent that the invention can be modified in arrangement and detail without departing from such principles. I claim all modifications and variation coming within the spirit and scope of the following claims.

We claim:

1. A method for an endpoint on a network to self-discover an unused address on a network segment and self-assign the unused address to itself, comprising:

listening for a network packet broadcast or unicast from a host system, the host system being another endpoint on the network, the network packet including a source address of the host system wherein the network packet is a type of packet that is predefined in an internet operating system of the network;

using the source address of the host system as a seed for generating a proposed address for the endpoint;

requesting an address resolution response from any device on the network having an assigned address matching the proposed address; and assigning the proposed network address to the endpoint when no device on the network responds to the address resolution request.

2. A method according to claim 1 wherein the host system generates the network packet from a web browser URL command and the endpoint derives the proposed address itself solely from the source address without requesting the proposed address from a network server on the network segment.

3. A method according to claim 1 wherein the host system generates the network packet through a DNS request.

4. A method according to claim 3 including configuring the host system to broadcast the network packet to any device on the network.

5. A method according to claim 1 wherein the network packet is transmitted and received using an internet protocol and the source address comprises an internet address.

6. A method according to claim 1 wherein generating the proposed address comprises one of said incrementing and decrementing the source address.

7. A method according to claim 6 including requesting the address resolution response for different proposed addresses until one of said proposed addresses receives no response from any network device.

8. A method according to claim 2 including the following:

transmitting the assigned endpoint address to the host system;

establishing an HTTP connection between the host system and the endpoint after receiving the endpoint address transmission;

operating the endpoint as a web server for the HTTP connection; and configuring the endpoint from the host system through the web server.

9. A method according to claim 3 including the following steps:

transmitting a unicast DNS request to a DNS file server;

promiscuously listening to the DNS request with the endpoint; and initiating generation of the proposed address when the endpoint promiscuously detects the DNS request.

10. A method according to claim 1 wherein the step of requesting the address resolution response comprises using an ARP request.

11. A method according to claim 1 including the following steps:

generating multiple network packets each including a source address and a domain name;

transmitting a preselected domain name with one of the multiple network packets;

prestoring the preselected domain name in the endpoint;

parsing the multiple network packets for the preselected domain name; and generating proposed addresses according to the source address for one of said multiple network packets having the preselected domain.

12. An IP address discovery system for self-discovering an unused address on a network, comprising:

a network including a network segment;

devices coupled to the network segment including an endpoint host system broadcasting or unicasting an IP packet having an IP source address for the host system wherein the IP packet is a type of packet that is predefined by an internet operating system of the network; and an endpoint coupled to the network segment and listening for the IP packet sent by the host system, the endpoint including:

an address generator for generating proposed IP addresses for the network segment upon detecting the IP packet and according to the source address broadcast or unicast from the host system independently of a network server with a configured network address, and a protocol for requesting a reply from any devices on the network segment assigned the proposed addresses and self-assigning one of the proposed addresses to the endpoint as an IP address when there is no reply to the request on the network segment.

13. A system according to claim 12 wherein the network uses one of an Ethernet, FDDI, and Token Ring Network protocol.

14. A system according to claim 12 wherein the host system includes a web browser that initiates the endpoint to begin generating proposed IP addresses.

15. A system according to claim 12 wherein the address generator generates the proposed IP addresses by incrementing or decrementing the host address.

16. A system according to claim 12 wherein the endpoint includes a register storing a domain name matching a domain name generated in the IP packet.

17. A system according to claim 16 wherein the endpoint comprises a network router, communication server, or personal computer.

18. A system according to claim 17 wherein the router includes a home page and the host system includes a web browser for connecting to the home page.

19. A method for assigning an IP address to an endpoint router coupled to a network, comprising:

generating a URL request from a web browser on an endpoint host computer;

broadcasting multiple DNS request packets over the network, one of the DNS request packets initiated by the URL request and including a host computer IP address and a preselected domain name;

said endpoint router detecting and parsing the multiple DNS request packets for one DNS packet containing the preselected domain name;

using the host computer IP address in the one DNS packet as a seed for generating a proposed IP address;

requesting an address resolution response for the proposed IP address from any network device having an assigned IP address matching the proposed IP address; and assigning the proposed IP address to the router when no device responds to the address resolution request.

20. A method according to claim 19 including establishing an HTTP connection between the host computer and the router after assigning the proposed IP address to the router; and configuring the router from the host system through the HTTP connection.

21. A system for automatically configuring endpoint devices on a network segment, the system comprising:

an endpoint host system coupled to the network segment, the host system preconfigured with an IP source address containing a network segment address and broadcasting or unicasting a source packet on the network segment containing the IP source address; and an endpoint network server coupling the network segment to an external network, the network interface server initially unconfigured with no network segment address and automatically deriving a proposed IP address using only the IP source address in the source packet broadcast or unicast by the host system independently of any configuration files from any other device on the network segment and broadcasting a request packet containing the proposed IP address, where the network interface unit automatically configures itself with the proposed IP address when no reply packet is receive in response to the request packet thereby allowing devices on the network segment to communicate with the external network.

22. The system of claim 21, wherein:

the source packet further includes one of a preselected domain name and a preselected broadcast address; and the network interface unit is further configured to monitor network communications traffic for the source packet containing one of the preselected domain name and the preselected broadcast address and derive the proposed IP address when the source packet containing one of the preselected domain name and the preselected broadcast address is received.

* * * * *